United States Patent
Katzav

(10) Patent No.: US 12,052,645 B2
(45) Date of Patent: Jul. 30, 2024

(54) NON-TERRESTRIAL NETWORK ROUND TRIP DELAY MITIGATION WITH PREDICTIVE BLIND LINK ADAPTATION

(71) Applicant: Parallel Wireless, Inc., Nashua, NH (US)

(72) Inventor: Ofir Ben Ari Katzav, Zur Itshak (IL)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 17/391,794

(22) Filed: Aug. 2, 2021

(65) Prior Publication Data

US 2022/0038988 A1 Feb. 3, 2022

Related U.S. Application Data

(60) Provisional application No. 62/706,130, filed on Aug. 2, 2020.

(51) Int. Cl.
| | |
|---|---|
| *H04W 40/12* | (2009.01) |
| *H04L 1/1607* | (2023.01) |
| *H04W 28/06* | (2009.01) |
| *H04W 52/24* | (2009.01) |

(52) U.S. Cl.
CPC .......... *H04W 40/12* (2013.01); *H04L 1/1607* (2013.01); *H04W 28/06* (2013.01); *H04W 52/24* (2013.01)

(58) Field of Classification Search
CPC ... H04B 17/373; H04L 1/1607; H04L 1/1854; H04W 28/06; H04W 40/12; H04W 52/24
See application file for complete search history.

(56) References Cited

U.S. PATENT DOCUMENTS

| | | | |
|---|---|---|---|
| 5,887,257 A | 3/1999 | Olds | |
| 8,670,373 B2 | 3/2014 | Yabo et al. | |
| 10,117,249 B2 | 10/2018 | Ravishankar et al. | |
| 10,547,375 B1 | 1/2020 | Iyer et al. | |
| 10,841,890 B2 * | 11/2020 | Sutton | H04L 1/1829 |
| 2005/0114892 A1 | 5/2005 | Chan | |
| 2009/0154391 A1 | 6/2009 | Wittenschlager | |
| 2010/0068993 A1 | 3/2010 | Khan | |
| 2013/0201905 A1 | 8/2013 | Ling et al. | |
| 2015/0318916 A1 | 11/2015 | Gopal et al. | |
| 2016/0006500 A1 | 1/2016 | Radpour | |
| 2017/0294957 A1 | 10/2017 | Ravishankar et al. | |
| 2018/0084476 A1 | 3/2018 | Kay et al. | |
| 2019/0149226 A1 | 5/2019 | Yabo et al. | |
| 2019/0181945 A1 | 6/2019 | Spirtus et al. | |
| 2019/0199427 A1 | 6/2019 | Zakaria et al. | |
| 2021/0314892 A1 * | 10/2021 | Rico Alvarino | H04W 74/0833 |
| 2022/0006566 A1 * | 1/2022 | Wang | H04L 5/0053 |
| 2022/0045803 A1 * | 2/2022 | Lin | H04L 1/1822 |
| 2022/0174635 A1 * | 6/2022 | Ryu | H04W 56/0045 |

FOREIGN PATENT DOCUMENTS

CN 107333241 B 11/2017

\* cited by examiner

*Primary Examiner* — Pao Sinkantarakorn
(74) *Attorney, Agent, or Firm* — Michael Y. Saji

(57) ABSTRACT

Systems, methods and computer software are disclosed for providing Non-Terrestrial Network (NTN) round trip delay mitigation. In one embodiment a method includes receiving, by a node in a NTN network, a data payload; and providing, by the node, an acknowledgement of reception of the payload although payload processing is not complete.

19 Claims, 6 Drawing Sheets

NON-TERRESTRIAL NETWORK ROUND TRIP DELAY MITIGATION WITH PREDICTIVE BLIND LINK ADAPTATION

CROSS-REFERENCE TO RELATED APPLICATIONS

This application claims priority under 35 U.S.C. § 119(e) to U.S. Provisional Pat. App. No. 62/706,130, filed Aug. 2, 2020, titled "Non-Terrestrial Network Round Trip Delay Mitigation with Predictive Blind Link Adaptation" which is hereby incorporated by reference in its entirety for all purposes. This application hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 9,879,416, "Heterogeneous Mesh Network and Multi-RAT Node Used Therein," filed May 9, 2013; U.S. Pat. No. 9,113,352, "Heterogeneous Self-Organizing Network for Access and Backhaul," filed Sep. 12, 2013; U.S. Pat. No. 9,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 9, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes. This document also hereby incorporates by reference U.S. Pat. Nos. 9,107,092, 9,867,418, and 9,232,547 in their entirety. This document also hereby incorporates by reference U.S. patent application Ser. Nos. 14/822,839, 15/828427, U.S. Pat. App. Pub. Nos. US20170273134A1, US20170127409A1 in their entirety. This application also hereby incorporates by reference in their entirety each of the following U.S. Pat. applications or Pat. App. Publications: US20180242396A1; US20150098387A1; US20170055186A1; US20170273134A1; US20170272330A1; and Ser. No. 15/713,584. This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019.

This application hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828427, U.S. Pat. App. Pub. Nos. US20170273134A1, US20170127409A1 in their entirety.

BACKGROUND

Non Terrestrial Networks (NTN) uses high above ground transceivers as opposed to terrestrial networks where the transceiver is placed on the ground or elevated on a pole or a tower. Traditionally, cellular networks are terrestrial in nature which makes sense for dense enough deployment in terms of cost and operation perspective. Such approach cannot be applied to remote or large areas with sparse user distribution. In such cases, the OPEX/CAPEX investment is not justified. As a potential solution, NTN can be applied to cellular networks as well.

3GPP considers adding NTN approach to be included in R17 and above covering 5G NTN capabilities. Where the standardization groups aim to solve various of conflicts resulted from the usage of NTN architecture compared to terrestrial network. Those conflicts demonstrated easily when one understands that the standard defines the communication between the base station and the user with very low delay intervals (e.g. UL data packet shall get ACK within 4 mSec in LTE, otherwise, it considered as NACK). Then, the main conflicts are raising from the much higher delay present due to the physical aspects of the NTN. Intuitive example, assume the NTN is implemented using satellite based base station, the much greater signal propagation delay along with the base station to satellite interface delay (assuming the satellite implements the RF parts and L1 and above are implemented on a ground station which is more realistic approach business wise).

There are various types of NTN architecture such as GEO/MEO/LEO/HAPS and others. In most cases, the delay between the MAC layers, for example, of the transmitting and receiving nodes is much greater than defined in 3GPP standards. Without forcing any standard and edge unit changes, the system shall adopt its behavior to absorb this significantly higher delay.

SUMMARY

A method is disclosed for providing Non-Terrestrial Network (NTN) round trip delay mitigation. In one embodiment the method includes receiving, by a node in a NTN network, a data payload; and providing, by the node, an acknowledgement of reception of the payload although payload processing is not complete.

In another embodiment a non-transitory computer-readable medium contains instructions providing Non-Terrestrial Network (NTN) round trip delay mitigation which, when executed, cause a system to perform steps comprising receiving, by a node in a NTN network, a data payload; and providing, by the node, an acknowledgement of reception of the payload although payload processing is not complete.

In another embodiment a system for providing Non-Terrestrial Network (NTN) round trip delay mitigation, comprises receiving, by a node in a NTN network, a data payload; and providing, by the node, an acknowledgement of reception of the payload although payload processing is not complete.

DETAILED DESCRIPTION

This invention aims to solve performance and robustness loss caused by such higher delay compared to standard definitions due to the inability of the base station to respond to the end-user within the time interval defined by the standard. Our focus will be on link adaptation for UL part.

Assumed system described (but not limited) as LTE system in which the UE shall be maintained as is. Namely, without any modification or awareness that it's being served by NTN LTE network. The eNB (or in general the base station) implemented on a centralized ground location which can communicate with multiple satellite (or any other air born platform) via a dedicated gateway (GW). The air born platform holds only the RF part along with some digital implementation which doesn't include L1 or above implementation. We'll also assume larger delay than depicted in standard. For example, 1 TTI worth of data is received by the base station and processed immediately in terrestrial case. As per the NTN architecture, we'll assume the delay between the transmission of a TTI to the TTI reception for L1 processing is greater than standard's defined response time (e.g. if the eNB shall response with HARQ feedback within 4 mSec, we'll assume that the time to receive the first sample of the data is greater than 4 mSec so there is no option to comply with standard's timing definitions by any means).

As described in the summary, we shall assume cellular base station architecture where the base station implementation is divided between a ground center (centralized location for example) and the RF part (namely, the air communication between the user to the base station) is done by air born platform (e.g. satellite but not only). The base station experiencing significantly higher delay between the air-born antennas to the baseband processing unit compared to the standard requirements (although same approach can be applied for close to zero delay).

Figure 1:
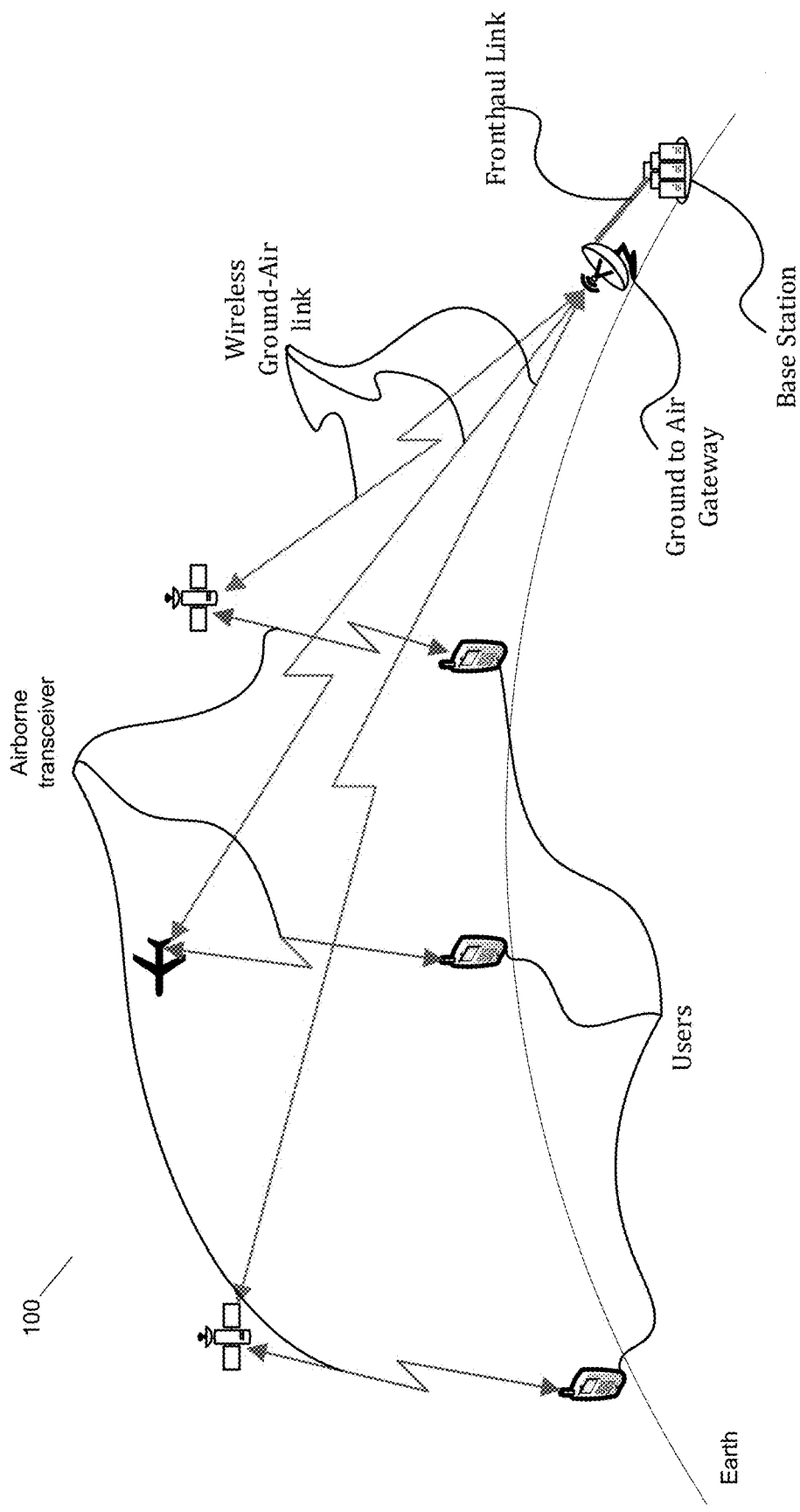
FIG. 1 is a system diagram showing an NTN, in accordance with some embodiments.

Example for NTN can be found in the FIG. 1. The NTN environment 100 includes a plurality of users, each in communication with a respective airborne transceiver such as a satellite or an aircraft. A wireless ground-air link provides a communication path from the air-born transceivers to a ground to air gateway, which in turn provides communication to a fronthaul link. NTN is understood to include satellites, atmospheric craft, and other such vehicles.

Main robustness/performance loss points this invention solves are:

Due to the higher than expected delay, the base station loses its ability to manage proper error correction process which includes feedbacks and combining (e.g. HARQ) as defined by the standard:

In the uplink: the base station won't be able to process the received data on time in order to provide reliable ACK/NACK to the UE In the downlink: the base station won't be able to react to the UE ACK/NACK in timely manner.

Such high delay will also cause the base station power control capabilities to become handicap. Namely, the uplink power control won't be fast enough in fast air channel changes due to the higher pipeline delay in such architecture. This can be a resolve of fast-moving characteristics of the RF part of the base station. The naive solution for such issue is to force the user to transmit in its maximal power which will cause fast battery draining and hence not considered as proper solution.

Handling of Error Correction Feedback Delay

As mentioned above, the error correction procedures (e.g. HARQ) defined by the standard to work in a specific cadence of messages with time constraints. Usually, when a feedback not received, it translates to specific feedback on the receiving side (either ACK or NACK). In NTN architecture, there are cases where this feedback cannot be received reliably within the time constraint due to higher round trip delays as described above. The naive approach will be to feedback automatically with either ACK or NACK.

Our approach will be to decide blindly and dynamically about the automatic feedback content (either ACK or NACK) based on various parameters of the system. In various embodiments of the present disclosure, one or more of the below features may be present:

Feature 1: in good link conditions, the side which receives the data payload and shall provide ACK or NACK will automatically respond with ACK although the data payload processing was not completed. This will allow the link to be properly active in presence of high round trip delays.

Feature 2: to ensure long lasting link conditions, link adaptation mechanism shall target to performance level below optimal ones with biasing toward robustness. E.g. assuming the link adaptation target to (e.g.) 10% BLER/BER/CRC error/SNR/SINR for proper robustness tradeoffs, in NTN networks, it will be tuned such that the link adaptation optimization target will be lowered (improved robustness) in proportion to the link adaptations command delays in the system and the air channel changes characteristics. Simplified example: assuming the air channel changes the SINR by 1 dB per 1 sec and the link adaptation command latency is 2 sec, then the link adaptation shall provide optimization that will account for the next 2 sec predicted air channel changes.

Feature 3: under certain link adaptation target (equals to SNR/SINR/BLER/CRC error and others) which reflects non-ideal link, the link adaptation will increase transmission robustness by downgrading MCS, allocation size (or similar) and increase transmitter's power above required level for systems that complies with the standard's latency.

Feature 4: the error correction mechanism (e.g. HARQ) will response with ACK in all cases except of high likelihood for decoding failures such as:

Predicted channel characteristics (e.g. SINR) is getting worse/drops below some threshold.

Link robustness improvement options utilized to some extent (e.g. power headroom of the transmitting side) and/or data payload combining gain exceeds other improvement options (e.g. lowering MCS provides less gain than HARQ combining)

Error correction gain provided by combining 1 or more retransmissions is greater than increasing transmit power/reducing MCS and/or allocation size.

Feature 5: with Feature 4, the receiving side will ask for different revision of the payload (decoder gain) with or without different transmission characteristics (e.g. TX power/MCS/etc.) and reply blindly with NACK.

Feature 6: with Feature 5, although the receiving side got two or more revisions of the payload, it can optimize its processing utilization properties by ignoring the second and above revision if the original transmission succeeded.

Feature 7: Feature 6 can be extended to be iterative, meaning, the receiving part will combine the first and second revisions, if first one failed in decoding, and retry decoding, upon success stop the process, upon failure, continue combining the next revision if available.

Feature 8: in cases of moving base station transceiver, prediction of channel characteristics can be done, and link adaptation mechanism shall consider that in forward looking instructions for the other side (e.g. User) such predication can be made by:
Relative Location and Speed of the Base Station and the User Repeatable route of the base station and relatively static UE can enjoy historical air channel characteristics with prediction model. This will allow AI based prediction to be applied with robustness backoff; resulting with higher average spectral efficiency/TPT.

In case of the NTN is implemented with non-stationary satellites and with "serving satellite" change every few minutes or more:

Link adaptation adapts to the satellite location—during sunrising and sunsetting periods, adapt to more robust link condition while being more aggressing otherwise.

Sunsetting satellite and next serving satellite exchange air channel information per user. Once "next serving satellite" becomes serving satellite it has a rough estimation of link quality during the serving period.

True in all cases of moving base station platforms when the serving platform changes over time Feature 9: with satellite based base station, where the signal propagates through the atmosphere, link adaptation shall consider the varying conditions based on the atmospheric conditions:

Weather aware link adaptation adds robustness factors for verity of conditions (e.g. heavy clouds/rain/lightning storms/etc.). Side information usage from external source connected to the base station.

Atmospheric components and density information provides link adaptation side information to adapt robustness accordingly.

Feature 10: with respect to transmit power control, in most wireless communication system this aspect is combined in the link adaptation mechanism. The transmit power for NTN architecture considers the following:

Transmit power adaptation shall target to the terrestrial network level with additional margin to compensate for higher propagation distance and delay In addition, transmit power target shall be adjusted to increase link SNR/SINR such that the probability of decoding increases in proportion to:
Robustness for Decoder Probability The time delay between two consecutive TX power commands with or without using prediction for the channel quality Feature 11: TX power can be adjusted to compensate the orbit of a non-stationary base station:

When the moving base station have a known route, it can be used as side information for path-loss prediction and hence power adjustments can be proactively made instead of reactive approach which is more common for non-NTNs In case of a changing "serving platform" in NTN networks, the current "serving platform" and the "next serving platform" can use side information sharing to mitigate potential inconsistency in path-loss/air channel during the "serving platform" switch.

Slightly before the switch, the current "serving platform" can start to provide TX power commends to direct the transmitted to the proper working point for the next" serving platform".

Figure 2A:
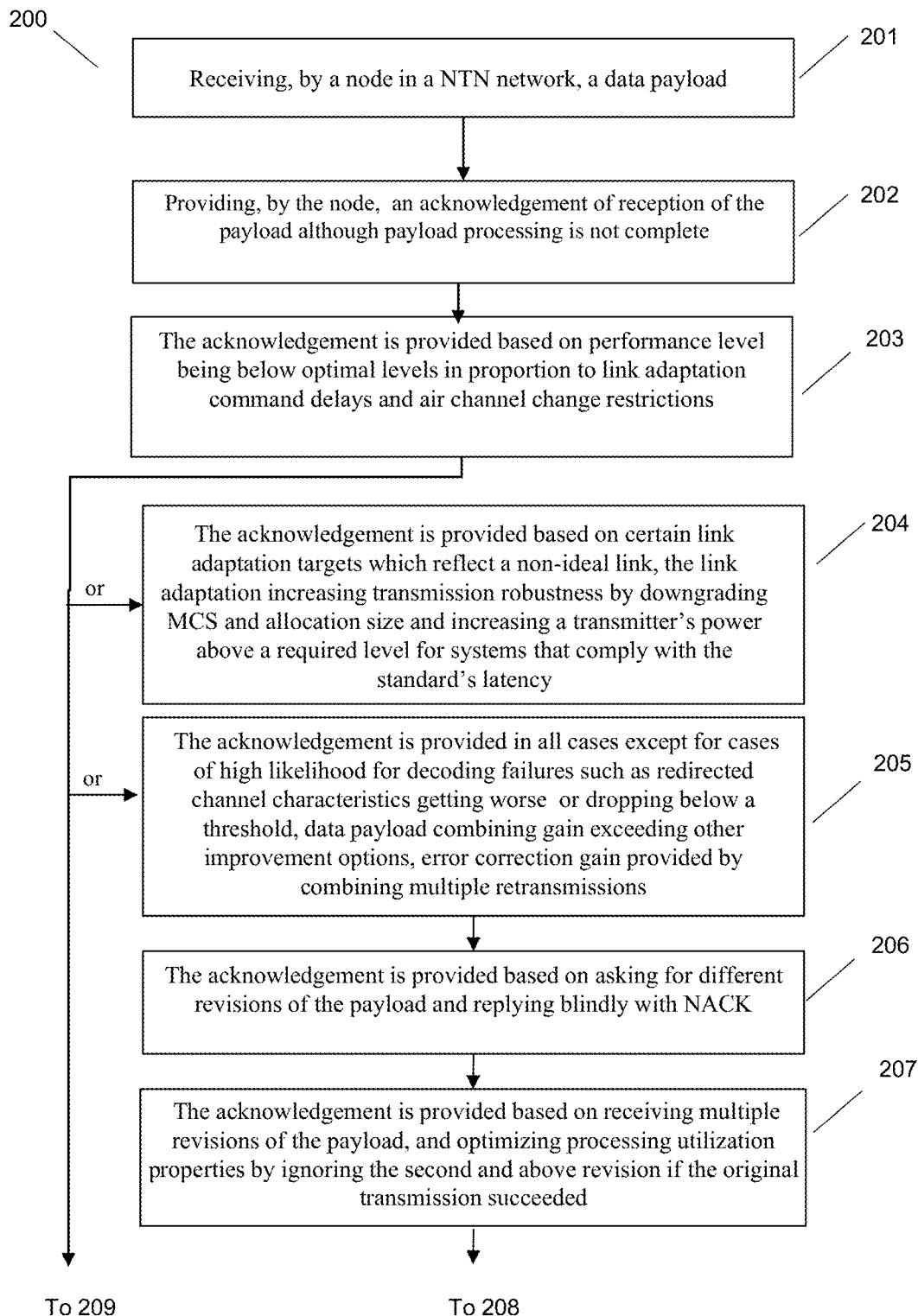
FIG. 2 (broken up into FIG. 2A and FIG. 2B) is a flow diagram showing a method for providing NTN round trip delay mitigation, in accordance with some embodiments.
Figure 2B:
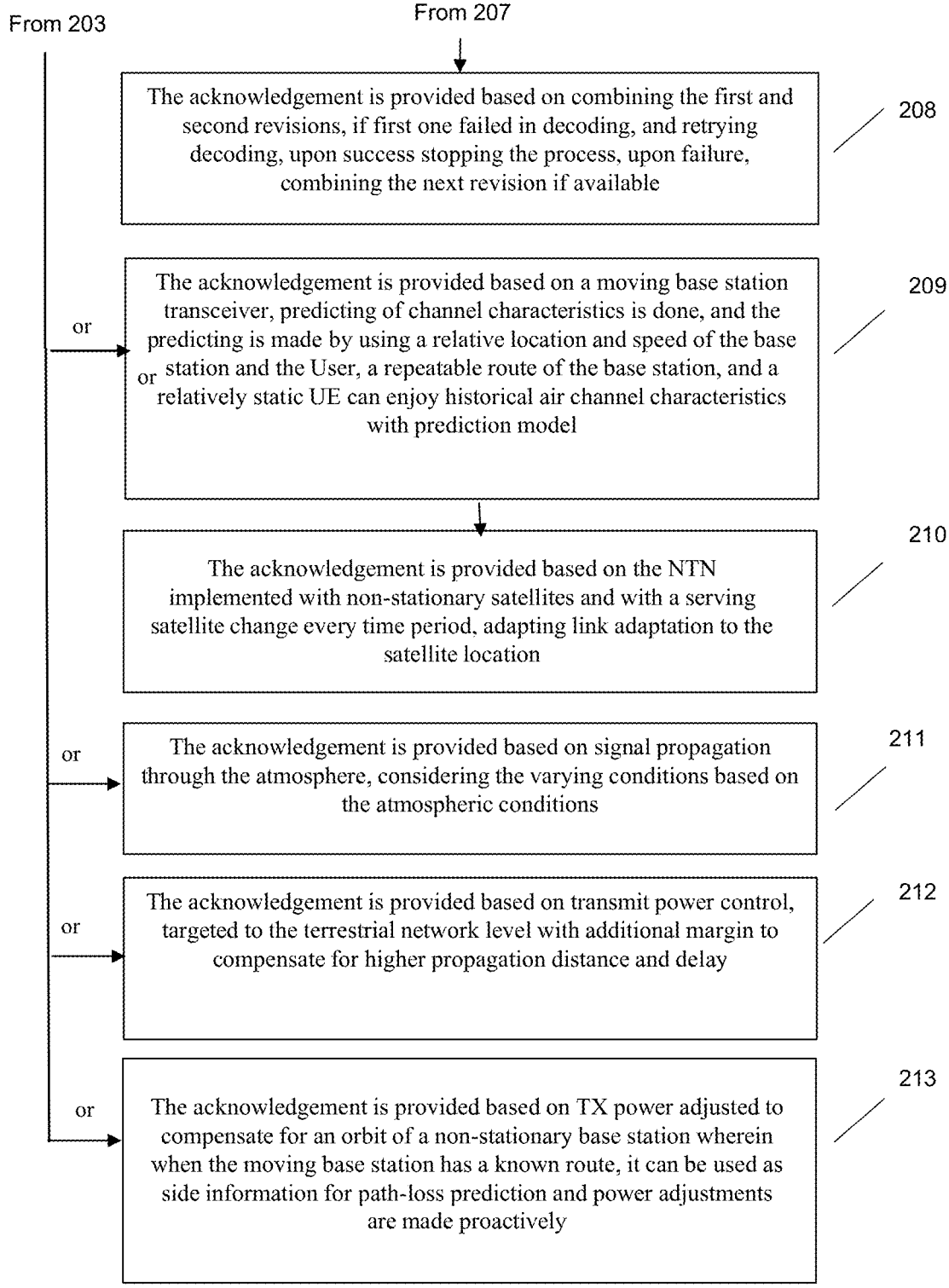

Referring to FIGS. 2A and 2B, a flow diagram of a particular embodiment of a method 200 for providing Non-Terrestrial Network (NTN) round trip delay mitigation is shown. Method 200 begins with processing block 201 which discloses receiving, by a node in a NTN network, a data payload.

Processing block 202 shows providing, by the node, an acknowledgement of reception of the payload although payload processing is not complete. The acknowledgement can take various forms as shown in the following processing blocks.

In processing block 203 one option is shown wherein the acknowledgement is provided based on performance level being below optimal levels in proportion to link adaptation command delays and air channel change restrictions.

In processing block 204 another option is shown wherein the acknowledgement is provided based on certain link adaptation targets which reflect a non-ideal link, the link adaptation increasing transmission robustness by downgrading MCS and allocation size and increasing a transmitter's power above a required level for systems that comply with the standard's latency.

In processing block 205 another option is shown wherein the acknowledgement is provided in all cases except for cases of high likelihood for decoding failures such as redirected channel characteristics getting worse or dropping below a threshold, data payload combining gain exceeding other improvement options, error correction gain provided by combining multiple retransmissions. Processing block 206 discloses wherein the acknowledgement is provided based on asking for different revisions of the payload and replying blindly with NACK. Processing block 207 shows wherein the acknowledgement is provided based on receiving multiple revisions of the payload, and optimizing processing utilization properties by ignoring the second and above revision if the original transmission succeeded. Processing block 208 recites wherein the acknowledgement is provided based on combining the first and second revisions, if first one failed in decoding, and retrying decoding, upon success stopping the process, upon failure, combining the next revision if available.

In processing block 209 another option is shown wherein the acknowledgement is provided based on a moving base station transceiver, predicting of channel characteristics is done, and the predicting is made by using a relative location and speed of the base station and the User, a repeatable route of the base station, and a relatively static UE can enjoy historical air channel characteristics with prediction model. Processing block 210 discloses wherein the acknowledgement is provided based on the NTN implemented with non-stationary satellites and with a serving satellite change every time period, adapting link adaptation to the satellite location.

In processing block 211 another option is shown wherein the acknowledgement is provided based on signal propagation through the atmosphere, considering the varying conditions based on the atmospheric conditions.

In processing block 212 another option is shown wherein the acknowledgement is provided based on transmit power control, targeted to the terrestrial network level with additional margin to compensate for higher propagation distance and delay.

In processing block 213 another option is shown wherein the acknowledgement is provided based on TX power adjusted to compensate for an orbit of a non-stationary base station wherein when the moving base station has a known route, it can be used as side information for path-loss prediction and power adjustments are made proactively.

Figure 3:
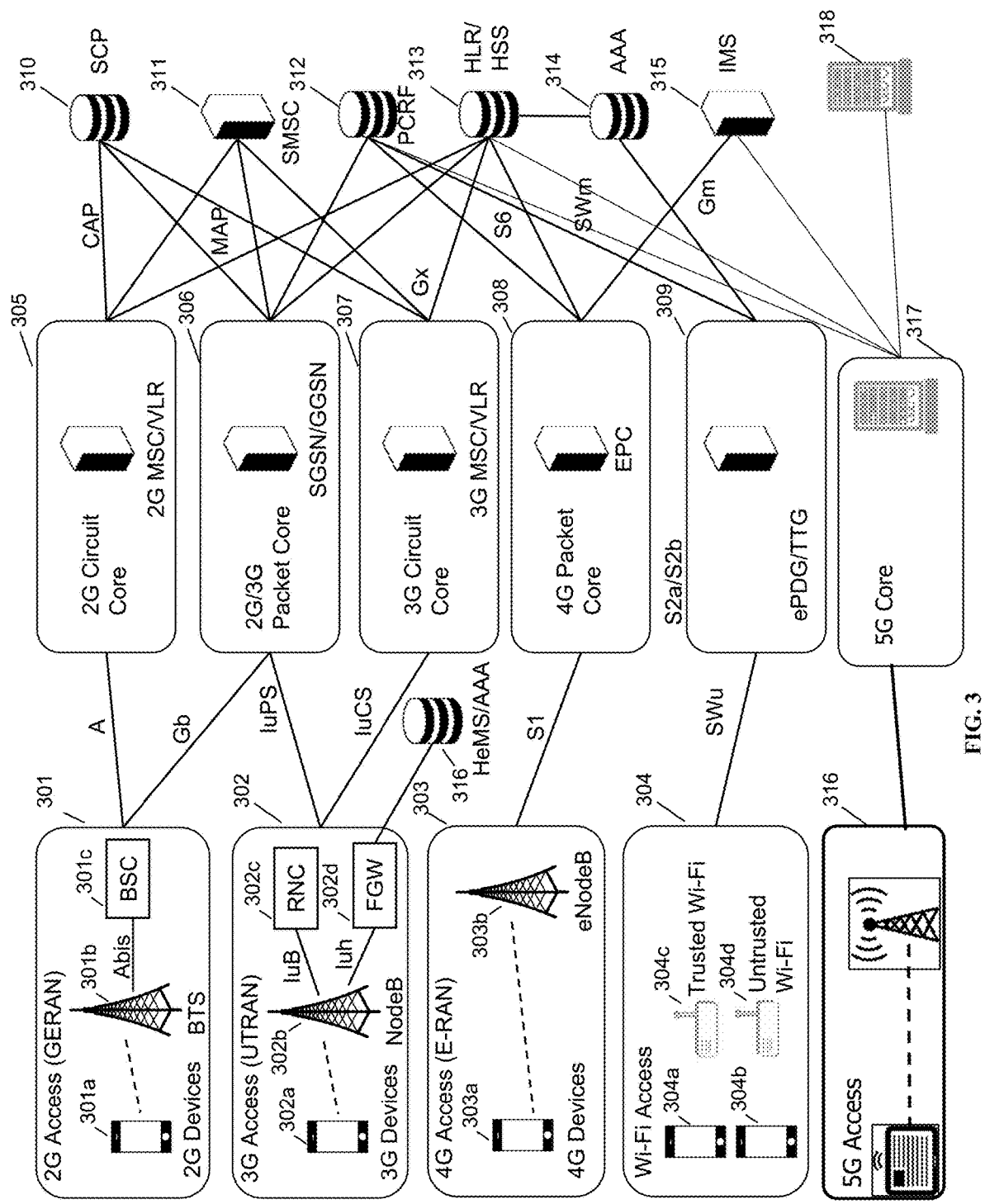
FIG. 3 is a schematic network architecture diagram for 3G and other-G networks.

FIG. 3 is a schematic network architecture diagram for 3G and other-G prior art networks. The diagram shows a plurality of "Gs," including 2G, 3G, 4G, 5G and Wi-Fi. 2G is represented by GERAN 301, which includes a 2G device 301a, BTS 301b, and BSC 301c. 3G is represented by UTRAN 302, which includes a 3G UE 302a, nodeB 302b, RNC 302c, and femto gateway (FGW, which in 3GPP namespace is also known as a Home nodeB Gateway or HNBGW) 302d. 4G is represented by EUTRAN or E-RAN 303, which includes an LTE UE 303a and LTE eNodeB 303b. Wi-Fi is represented by Wi-Fi access network 304, which includes a trusted Wi-Fi access point 304c and an untrusted Wi-Fi access point 304d. The Wi-Fi devices 304a and 304b may access either AP 304c or 304d. In the current network architecture, each "G" has a core network. 2G circuit core network 305 includes a 2G MSC/VLR; 2G/3G packet core network 306 includes an SGSN/GGSN (for EDGE or UMTS packet traffic); 3G circuit core 307 includes a 3G MSC/VLR; 4G circuit core 308 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 330, the SMSC 331, PCRF 332, HLR/HSS 333, Authentication, Authorization, and Accounting server (AAA) 334, and IP Multimedia Subsystem (IMS) 335. An HeMS/AAA 336 is present in some cases for use by the 3G UTRAN. The diagram is used to indicate schematically the basic functions of each network as known to one of skill in the art, and is not intended to be exhaustive. For example, 3G core 317 is shown using a single interface to 3G access 316, although in some cases 3G access can be supported using dual connectivity or via a non-standalone deployment architecture.

Noteworthy is that the RANs 301, 302, 303, 304 and 336 rely on specialized core networks 305, 306, 307, 308, 309, 337 but share essential management databases 330, 331, 332, 333, 334, 335, 338. More specifically, for the 2G GERAN, a BSC 301c is required for Abis compatibility with BTS 301b, while for the 3G UTRAN, an RNC 302c is required for Iub compatibility and an FGW 302d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

Figure 4:
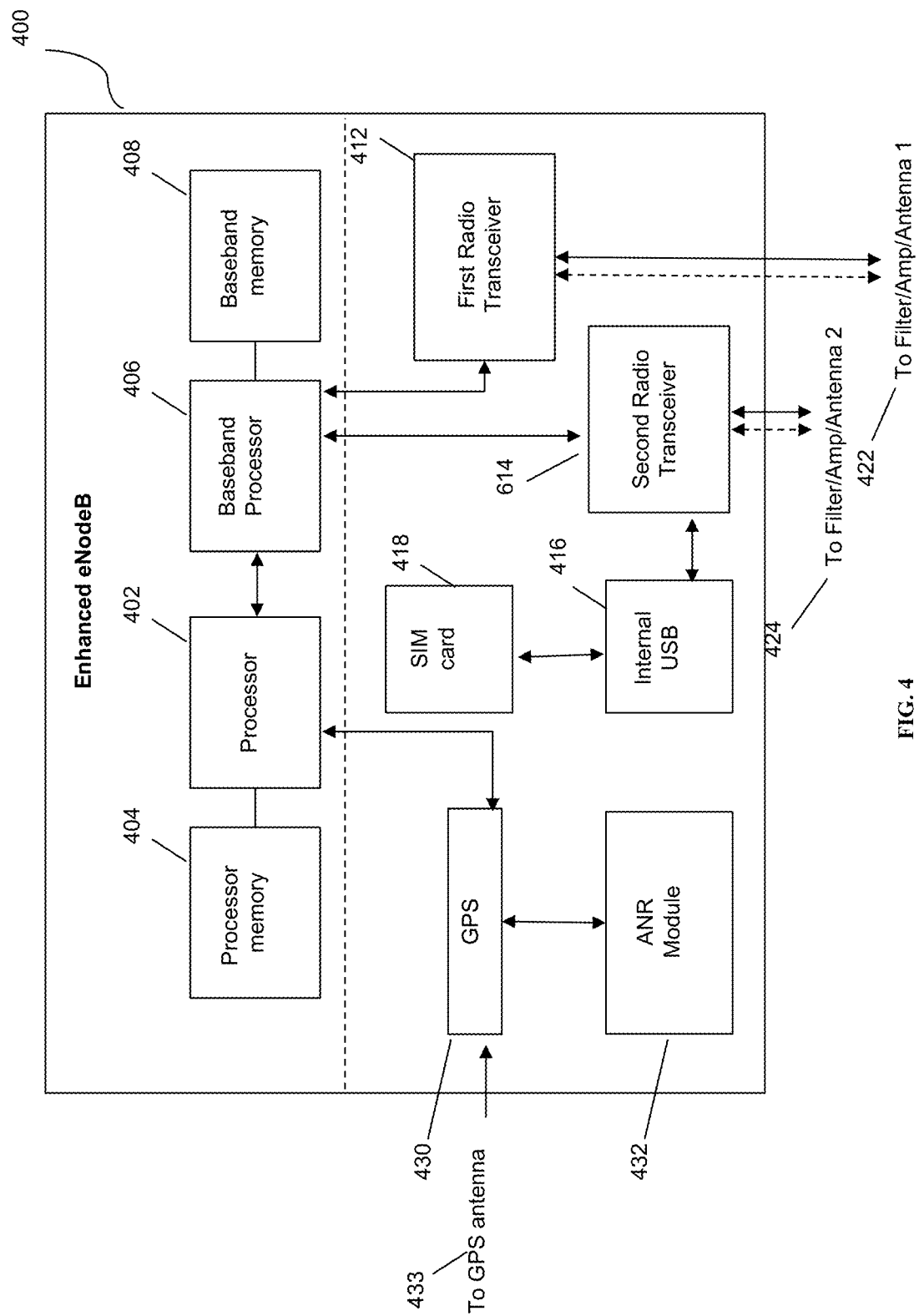
FIG. 4 is an enhanced eNodeB for performing the methods described herein, in accordance with some embodiments.

FIG. 4 is an enhanced base station for performing the methods described herein, in accordance with some embodiments. Base station 400 may include processor 402, processor memory 404 in communication with the processor, baseband processor 406, and baseband processor memory 408 in communication with the baseband processor. Mesh network node 400 may also include first radio transceiver 412 and second radio transceiver 414, internal universal serial bus (USB) port 416, and subscriber information module card (SIM card) 418 coupled to USB port 416. In some embodiments, the second radio transceiver 414 itself may be coupled to USB port 416, and communications from the baseband processor may be passed through USB port 416. The second radio transceiver may be used for wirelessly backhauling eNodeB 400.

Processor 402 and baseband processor 406 are in communication with one another. Processor 402 may perform routing functions, and may determine if/when a switch in network configuration is needed. Baseband processor 406 may generate and receive radio signals for both radio transceivers 412 and 414, based on instructions from processor 402. In some embodiments, processors 402 and 406 may be on the same physical logic board. In other embodiments, they may be on separate logic boards.

Processor 402 may identify the appropriate network configuration, and may perform routing of packets from one network interface to another accordingly. Processor 402 may use memory 404, in particular to store a routing table to be used for routing packets. Baseband processor 406 may perform operations to generate the radio frequency signals for transmission or retransmission by both transceivers 410 and 412. Baseband processor 406 may also perform operations to decode signals received by transceivers 412 and 414. Baseband processor 406 may use memory 408 to perform these tasks.

The first radio transceiver 412 may be a radio transceiver capable of providing LTE eNodeB functionality, and may be capable of higher power and multi-channel OFDMA. The second radio transceiver 414 may be a radio transceiver capable of providing LTE UE functionality. Both transceivers 412 and 414 may be capable of receiving and transmitting on one or more LTE bands. In some embodiments, either or both of transceivers 412 and 414 may be capable of providing both LTE eNodeB and LTE UE functionality. Transceiver 412 may be coupled to processor 402 via a Peripheral Component Interconnect-Express (PCI-E) bus, and/or via a daughtercard. As transceiver 414 is for providing LTE UE functionality, in effect emulating a user equipment, it may be connected via the same or different PCI-E bus, or by a USB bus, and may also be coupled to SIM card 418. First transceiver 412 may be coupled to first radio frequency (RF) chain (filter, amplifier, antenna) 422, and second transceiver 414 may be coupled to second RF chain (filter, amplifier, antenna) 424.

SIM card 418 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 400 is not an ordinary UE but instead is a special UE for providing backhaul to device 400.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 412 and 414, which may be 3G, 4G, 5G, Wi-Fi 402.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 402 for reconfiguration.

A GPS module 430 may also be included, and may be in communication with a GPS antenna 432 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 432 may also be present and may run on processor 402 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 5:
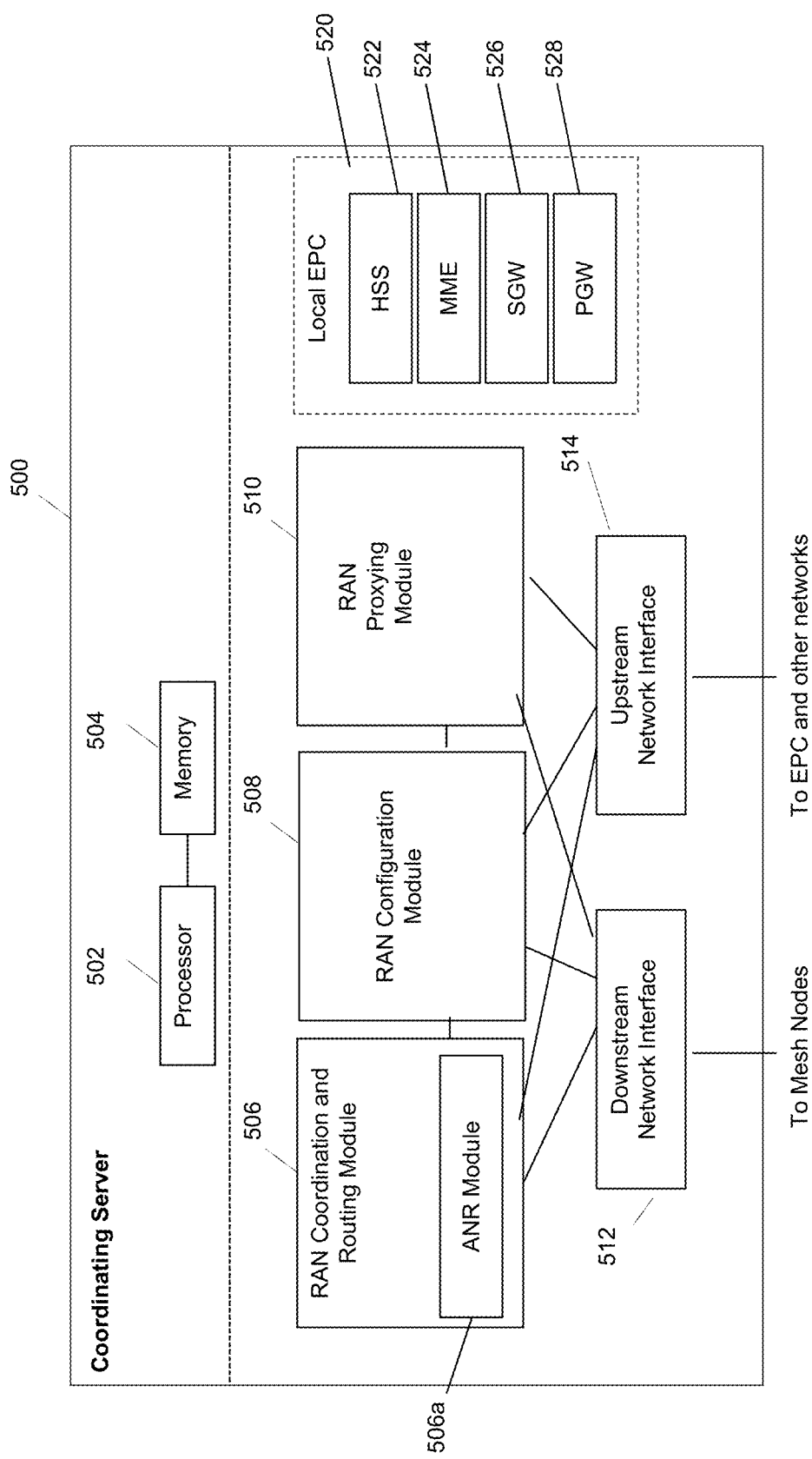
FIG. 5 is a coordinating server for providing services and performing methods as described herein, in accordance with some embodiments.

FIG. 5 is a coordinating server for providing services and performing methods as described herein, in accordance with some embodiments. Coordinating server 500 includes processor 502 and memory 504, which are configured to provide the functions described herein. Also present are radio access network coordination/routing (RAN Coordination and routing) module 506, including ANR module 506a, RAN configuration module 508, and RAN proxying module 510. The ANR module 506a may perform the ANR tracking, PCI disambiguation, ECGI requesting, and GPS coalescing and tracking as described herein, in coordination with RAN coordination module 506 (e.g., for requesting ECGIs, etc.). In some embodiments, coordinating server 500 may coordinate multiple RANs using coordination module 506. In some embodiments, coordination server may also provide proxying, routing virtualization and RAN virtualization, via modules 510 and 508. In some embodiments, a downstream network interface 512 is provided for interfacing with the RANs, which may be a radio interface (e.g., LTE), and an upstream network interface 514 is provided for interfacing with the core network, which may be either a radio interface (e.g., LTE) or a wired interface (e.g., Ethernet).

Coordinator 500 includes local evolved packet core (EPC) module 520, for authenticating users, storing and caching priority profile information, and performing other EPC-dependent functions when no backhaul link is available. Local EPC 520 may include local HSS 522, local MME 524, local SGW 526, and local PGW 528, as well as other modules. Local EPC 520 may incorporate these modules as software modules, processes, or containers. Local EPC 520 may alternatively incorporate these modules as a small number of monolithic software processes. Modules 506, 508, 510 and local EPC 520 may each run on processor 502 or on another processor, or may be located within another device.

The protocols described herein have largely been adopted by the 3GPP as a standard for the upcoming 5G network technology as well, in particular for interfacing with 4G/LTE technology. For example, X2 is used in both 4G and 5G and is also complemented by 5G-specific standard protocols called Xn. Additionally, the 5G standard includes two phases, non-standalone (which will coexist with 4G devices and networks) and standalone, and also includes specifications for dual connectivity of UEs to both LTE and NR ("New Radio") 5G radio access networks. The inter-base station protocol between an LTE eNB and a 5G gNB is called Xx. The specifications of the Xn and Xx protocol are understood to be known to those of skill in the art and are hereby incorporated by reference dated as of the priority date of this application.

In some embodiments, several nodes in the 4G/LTE Evolved Packet Core (EPC), including mobility management entity (MME), MME/serving gateway (S-GW), and MME/S-GW are located in a core network. Where shown in the present disclosure it is understood that an MME/S-GW is representing any combination of nodes in a core network, of whatever generation technology, as appropriate. The present disclosure contemplates a gateway node, variously described as a gateway, HetNet Gateway, multi-RAT gateway, LTE Access Controller, radio access network controller, aggregating gateway, cloud coordination server, coordinating gateway, or coordination cloud, in a gateway role and position between one or more core networks (including multiple operator core networks and core networks of heterogeneous RATs) and the radio access network (RAN). This gateway node may also provide a gateway role for the X2 protocol or other protocols among a series of base stations. The gateway node may also be a security gateway, for example, a TWAG or ePDG. The RAN shown is for use at least with an evolved universal mobile telecommunications system terrestrial radio access network (E-UTRAN) for 4G/LTE, and for 5G, and with any other combination of RATs, and is shown with multiple included base stations, which may be eNBs or may include regular eNBs, femto cells, small cells, virtual cells, virtualized cells (i.e., real cells behind a virtualization gateway), or other cellular base stations, including 3G base stations and 5G base stations (gNBs), or base stations that provide multi-RAT access in a single device, depending on context.

In the present disclosure, the words "eNB," "eNodeB," and "gNodeB" are used to refer to a cellular base station. However, one of skill in the art would appreciate that it would be possible to provide the same functionality and services to other types of base stations, as well as any equivalents, such as Home eNodeBs. In some cases Wi-Fi may be provided as a RAT, either on its own or as a component of a cellular access network via a trusted wireless access gateway (TWAG), evolved packet data network gateway (ePDG) or other gateway, which may be the same as the coordinating gateway described hereinabove.

The word "X2" herein may be understood to include X2 or also Xn or Xx, as appropriate. The gateway described herein is understood to be able to be used as a proxy, gateway, B2BUA, interworking node, interoperability node, etc. as described herein for and between X2, Xn, and/or Xx, as appropriate, as well as for any other protocol and/or any other communications between an LTE eNB, a 5G gNB (either NR, standalone or non-standalone). The gateway described herein is understood to be suitable for providing a stateful proxy that models capabilities of dual connectivity-capable handsets for when such handsets are connected to any combination of eNBs and gNBs. The gateway described herein may perform stateful interworking for master cell group (MCG), secondary cell group (SCG), other dual-connectivity scenarios, or single-connectivity scenarios.

In some embodiments, the base stations described herein may be compatible with a Long Term Evolution (LTE) radio transmission protocol, or another air interface. The LTE-compatible base stations may be eNodeBs, or may be gNodeBs, or may be hybrid base stations supporting multiple technologies and may have integration across multiple cellular network generations such as steering, memory sharing, data structure sharing, shared connections to core network nodes, etc. In addition to supporting the LTE protocol, the base stations may also support other air interfaces, such as UMTS/HSPA, CDMA/CDMA2000, GSM/EDGE, GPRS, EVDO, other 3G/2G, legacy TDD, 5G, or other air interfaces used for mobile telephony. In some embodiments, the base stations described herein may support Wi-Fi air interfaces, which may include one of 902.11a/b/g/n/ac/ad/af/ah. In some embodiments, the base stations described herein may support 902.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 902.11a/b/g/n/ac/af/p/h. In some embodiments, the base stations described herein may support IEEE 902.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The protocols described herein have largely been adopted by the 3GPP as a standard for the upcoming 5G network technology as well, in particular for interfacing with 4G/LTE technology. For example, X2 is used in both 4G and 5G and is also complemented by 5G-specific standard protocols called Xn. Additionally, the 5G standard includes two phases, non-standalone (which will coexist with 4G devices and networks) and standalone, and also includes specifications for dual connectivity of UEs to both LTE and NR ("New Radio") 5G radio access networks. The inter-base station protocol between an LTE eNB and a 5G gNB is called Xx. The specifications of the Xn and Xx protocol are understood to be known to those of skill in the art and are hereby incorporated by reference dated as of the priority date of this application.

In some embodiments, several nodes in the 4G/LTE Evolved Packet Core (EPC), including mobility management entity (MME), MME/serving gateway (S-GW), and MME/S-GW are located in a core network. Where shown in the present disclosure it is understood that an MME/S-GW is representing any combination of nodes in a core network, of whatever generation technology, as appropriate. The present disclosure contemplates a gateway node, variously described as a gateway, HetNet Gateway, multi-RAT gateway, LTE Access Controller, radio access network controller, aggregating gateway, cloud coordination server, coordinating gateway, or coordination cloud, in a gateway role and position between one or more core networks (including multiple operator core networks and core networks of heterogeneous RATs) and the radio access network (RAN). This gateway node may also provide a gateway role for the X2 protocol or other protocols among a series of base stations. The gateway node may also be a security gateway, for example, a TWAG or ePDG. The RAN shown is for use at least with an evolved universal mobile telecommunications system terrestrial radio access network (E-UTRAN) for 4G/LTE, and for 5G, and with any other combination of RATs, and is shown with multiple included base stations, which may be eNBs or may include regular eNBs, femto cells, small cells, virtual cells, virtualized cells (i.e., real cells behind a virtualization gateway), or other cellular base stations, including 3G base stations and 5G base stations (gNBs), or base stations that provide multi-RAT access in a single device, depending on context.

The invention claimed is:

1. A method of providing Non-Terrestrial Network (NTN) round trip delay mitigation, comprising:
   receiving, by a node in a NTN network, a data payload; and
   providing, by the node, an acknowledgement of reception of the payload although payload processing is not complete,
   wherein the acknowledgement is provided based on certain link adaptation targets which reflect a non-ideal link, the link adaptation increasing transmission robustness by downgrading MCS and allocation size and increasing a transmitter's power above a required level for systems that comply with the standard's latency.

2. The method of claim 1, wherein the acknowledgement is provided based on performance level being below optimal levels in proportion to link adaptation command delays and air channel change restrictions.

3. The method of claim 1, wherein the acknowledgement is provided in all cases except for cases of high likelihood for decoding failures such as redirected channel characteristics getting worse or dropping below a threshold, data payload combining gain exceeding other improvement options, error correction gain provided by combining multiple retransmissions.

4. The method of claim 3, wherein the acknowledgement is provided based on asking for different revisions of the payload and replying blindly with NACK.

5. The method of claim 4, wherein the acknowledgement is provided based on receiving multiple revisions of the payload, and optimizing processing utilization properties by ignoring the second and above revision if the original transmission succeeded.

6. The method of claim 5, wherein the acknowledgement is provided based on combining the first and second revisions, if first one failed in decoding, and retrying decoding, upon success stopping the process, upon failure, combining the next revision if available.

7. The method of claim 1, wherein the acknowledgement is provided based on a moving base station transceiver, predicting of channel characteristics is done, and the predicting is made by using a relative location and speed of the base station and the User, and a repeatable route of the base station.

8. The method of claim 7, wherein the acknowledgement is provided based on the NTN implemented with non-stationary satellites and with a serving satellite change every time period, adapting link adaptation to the satellite location.

9. The method of claim 1, wherein the acknowledgement is provided based on signal propagation through the atmosphere, considering the varying conditions based on the atmospheric conditions.

10. The method of claim 1, wherein the acknowledgement is provided based on transmit power control, targeted to the terrestrial network level with additional margin to compensate for higher propagation distance and delay.

11. The method of claim 1, wherein the acknowledgement is provided based on TX power adjusted to compensate for an orbit of a non-stationary base station wherein when the non-stationary base station has a known route, the known route can be used as side information for path-loss prediction and power adjustments are made proactively.

12. A non-transitory computer-readable medium containing instructions for providing Non-Terrestrial Network (NTN) round trip delay mitigation which, when executed, cause a system to perform steps comprising:
    receiving, by a node in a NTN network, a data payload; and
    providing, by the node, an acknowledgement of reception of the payload although payload processing is not complete,
    wherein the acknowledgement is provided based on certain link adaptation targets which reflect a non-ideal link, the link adaptation increasing transmission robustness by downgrading MCS and allocation size and increasing a transmitter's power above a required level for systems that comply with the standard's latency.

13. The computer readable medium of claim 12, further comprising instructions wherein the acknowledgement is provided based on performance level being below optimal levels in proportion to link adaptation command delays and air channel change restrictions.

14. The computer readable medium of claim 12, further comprising instructions wherein the acknowledgement is provided in all cases except for cases of high likelihood for decoding failures such as redirected channel characteristics getting worse or dropping below a threshold, data payload combining gain exceeding other improvement options, error correction gain provided by combining multiple retransmissions.

15. The computer readable medium of claim 12, further comprising instructions wherein the acknowledgement is provided based on a moving base station transceiver, predicting of channel characteristics is done, and the predicting is made by using a relative location and speed of the base station and the User, and a repeatable route of the base station.

16. The computer readable medium of claim 12, further comprising instructions wherein the acknowledgement is provided based on the NTN implemented with non-stationary satellites and with a serving satellite change every time period, adapting link adaptation to the satellite location.

17. A system for providing Non-Terrestrial Network (NTN) round trip delay mitigation, comprising:
    a node in an NTN network, wherein the node is configured to perform steps comprising:
    receiving, by a node in a NTN network, a data payload; and
    providing, by the node, an acknowledgement of reception of the payload although payload processing is not complete,
    wherein the acknowledgement is provided based on certain link adaptation targets which reflect a non-ideal link, the link adaptation increasing transmission robustness by downgrading MCS and allocation size and increasing a transmitter's power above a required level for systems that comply with the standard's latency.

18. The system of claim 17 wherein the acknowledgement is provided based on performance level being below optimal levels in proportion to link adaptation command delays and air channel change restrictions.

19. The system of claim 17, wherein the acknowledgement is provided in all cases except for cases of high likelihood for decoding failures such as redirected channel characteristics getting worse or dropping below a threshold, data payload combining gain exceeding other improvement options, error correction gain provided by combining multiple retransmissions.

* * * * *